US008837456B2

(12) United States Patent
Shin et al.

(10) Patent No.: US 8,837,456 B2

(45) Date of Patent: Sep. 16, 2014

(54) CELL SEARCHER OF MOBILE TERMINAL AND NEIGHBOR CELL SEARCHING METHOD THEREOF

(75) Inventors: Eun-Jeong Shin, Daejeon (KR); Il Gyu Kim, Chungcheongbuk-do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 155 days.

(21) Appl. No.: 13/297,450

(22) Filed: Nov. 16, 2011

(65) Prior Publication Data

US 2012/0122453 A1 May 17, 2012

(30) Foreign Application Priority Data

Nov. 17, 2010 (KR) ........................ 10-2010-0114537

(51) Int. Cl.

*H04W 48/16* (2009.01)
*H04L 25/02* (2006.01)
*H04W 36/00* (2009.01)

(52) U.S. Cl.

CPC ............. *H04W 48/16* (2013.01); *H04L 25/022* (2013.01); *H04W 36/0083* (2013.01)
USPC ............................ 370/350; 455/434; 455/502

(58) Field of Classification Search

None
See application file for complete search history.

(56) References Cited

U.S. PATENT DOCUMENTS 6,741,578 B1 * 5/2004 Moon et al. .................. 370/335
7,324,479 B2 1/2008 Hur
2008/0019350 A1 * 1/2008 Onggosanusi et al. ....... 370/350
2009/0011762 A1 * 1/2009 Han et al. ...................... 455/434
2009/0067370 A1 * 3/2009 Kim et al. ..................... 370/328
2010/0074199 A1 * 3/2010 Shin et al. ..................... 370/329
2012/0046056 A1 * 2/2012 Luo et al. ...................... 455/502

FOREIGN PATENT DOCUMENTS

JP 2008118309 A 5/2008
KR 1020010112338 A 12/2001
KR 1020060071766 A 6/2006
KR 1020100033905 A 3/2010

OTHER PUBLICATIONS

H.-G. Park et al., Efficient coherent neighbor cell search for synchronous 3GPP LTE system, Electronics Letters, Oct. 9, 2008, vol. 44, No. 21.

* cited by examiner

*Primary Examiner* — Chirag Shah
*Assistant Examiner* — Rina Pancholi
(74) *Attorney, Agent, or Firm* — William Park & Associates Ltd.

(57) ABSTRACT

Provided are a cell searcher for handover of a mobile terminal and a neighbor cell searching method thereof. The neighbor cell searching method includes: after searching a home cell, determining whether a Primary Synchronization Signal (PSS) code of the home cell is identical to that of a neighbor cell; when the PPS code of the home cell is identical to that of the neighbor cell, cancelling a PSS symbol of the home cell from a received signal in a time domain; and searching a neighbor cell from the received signal cancelled the PSS symbol of the home cell.

17 Claims, 6 Drawing Sheets

14
40
SSCH Cross Correlator
50
L1 Controller
H
Home Cell Cancellation
Home Cell CP type
Neighbor Cell Activation
Buffer On
30
33
Home Cell Channel Canceller
31
PSS Channel Evaluator
FFT
Filter
IFFT
Correlator
PSS Code
PSCH Signal Generator
32
Frequency Domain Home Cell Channel Evaluator
FFT
Filter
IFFT
Correlator
Home Cell ID
BSCH Signal Generator
PSS
SSS
20
FFT

CELL SEARCHER OF MOBILE TERMINAL AND NEIGHBOR CELL SEARCHING METHOD THEREOF

CROSS-REFERENCE TO RELATED APPLICATIONS

This U.S. non-provisional patent application claims priority under 35 U.S.C. §119 of Korean Patent Application No. 10-2010-0114537, filed on Nov. 17, 2010, the entire contents of which are hereby incorporated by reference.

BACKGROUND OF THE INVENTION

The present invention disclosed herein relates to a cell searcher for handover of a mobile terminal and a neighbor cell searching method thereof.

In a 3rd Generation Partnership Project (3GPP) Long Term Evolution (LTE) system, a base station cannot receive information about a neighbor cell unlike a typical communication system. Accordingly, a mobile terminal cannot receive neighbor cell information from the base station. Accordingly, the mobile terminal requires high detection probability for neighbor cells and real-time processing for searching neighbor cells, in order to achieve fast handover.

The mobile terminal may acquire symbol synchronization by using a Primary Synchronization Signal (PSS). Additionally, the mobile terminal may detect Secondary Synchronization Signal (SSS) after the acquiring of the PSS. The mobile terminal may acquire a cell identifier (cell ID), a CP type, and wireless frame synchronization acquisition by using the obtained SSS. Therefore, when the mobile terminal is handed over to a neighbor cell, it needs to estimate information about neighbor cells by using the PSS and SSS.

The 3GPP LTE system may generate 504 cell IDs by using 3 PSS symbols and 168 SSS symbols. The 3 PSS codes increase presence probability of a neighbor cell having the same PSS code around a specific cell. Therefore, if the PSSs of a home cell and a neighbor cell are the same, a channel coefficient value greatly serves due to the PS of a home cell, so that the detection probability of SSS is reduced in a mobile terminal or the neighbor cell detection probability is reduced since the PSS symbol information of a home cell is reflected on the output symbol timing of a PS code detector.

SUMMARY OF THE INVENTION

The present invention provides a cell searcher of a mobile terminal allowing neighbor cell search to be easy regardless of synchronization and asynchronization and a cell searching method thereof.

Embodiments of the present invention provide neighbor cell searching methods of a mobile terminal including: after searching a home cell, determining whether a Primary Synchronization Signal (PSS) code of the home cell is identical to that of a neighbor cell; when the PSS code of the home cell is identical to that of the neighbor cell, cancelling a PSS symbol of the home cell from a received signal in a time domain; and searching a neighbor cell from the received signal cancelled the PSS symbol of the home cell.

In some embodiments, the cancelling of the PSS symbol of the home cell may further include estimating a channel coefficient using a Secondary Synchronization Signal (SSS) symbol of the home cell.

In other embodiments, the cancelling of the PSS symbol of the home cell may further include cancelling the estimated PSS symbol of the home cell in a time domain.

In still other embodiments, the cancelling of the PSS symbol of the home cell may include: estimating the channel coefficient of the home cell using the SSS code of the home cell; multiplying the estimated channel coefficient of the home cell by the PSS code of the home cell to estimate the PSS symbol of the home cell; and converting the estimated PSS symbol of the home cell in a frequency domain into a time domain; and cancelling the converted PSS symbol of the home cell from a received signal inputted in a buffer in real-time while the PSS symbol of the home is transmitted in a time domain.

In even other embodiments, the methods may further include searching the neighbor cell from the received signal when the PSS code of the home cell is not identical to that of the neighbor cell.

In yet other embodiments, the mobile terminal may use a communication protocol of a 3rd Generation Partnership Project (3GPP) Long Term Evolution (LTE) system.

In further embodiments, each of the home cell and the neighbor cell may correspond to a combination of one of 3 PSS codes and one of 168 SSS codes.

In still further embodiments, the searching of the neighbor cell may include detecting one of the 3 PSS codes corresponding to the neighbor cell and detecting one of the 168 SSS codes corresponding to the neighbor cell.

In other embodiments of the present invention, cell searchers of a mobile terminal include: a decimator down-sampling a clock frequency of a received signal into an internally-processable sampling ratio; a time domain home cell canceller receiving a signal outputted from the decimator and, when the PSS code of the home cell is identical to that of the neighbor cell, cancelling a PSS symbol of the home cell from a signal outputted from the decimator in a time domain; a PSS detector detecting a PSS code by performing a cross correlation operation, on receiving a signal outputted from the time domain home cell canceller; and an SSS detector detecting an SSS code by performing the cross correlation operation, on receiving of the signal outputted from the time domain home cell canceller.

In some embodiments, during an initial cell search operation of the mobile terminal, the time domain home cell canceller may deliver a signal outputted from the decimator into the PSS detector and the SSS detector.

In other embodiments, when the PSS code of the home cell is not identical to that of the neighbor cell during a neighbor cell search operation of the mobile terminal, the time domain home cell canceller may deliver a signal outputted from the decimator to the PSS detector and the SSS detector.

In still other embodiments, the time domain home cell canceller may include: a first fast fourier transformer, after storing an SSS symbol of the home cell from an output of the decimator using previously estimated symbol timing information and radio frame synchronization information of a home cell, transforming the stored SSS symbol into a frequency domain; a first multiplier multiplying an output of a the first fast fourier transformer by a conjugate value of an SSS code of the home cell to estimate a channel coefficient of the home cell; a first inverse fast fourier transformer converting an output of the first multiplier into a time domain; a windower windowing time impulse to extract a signal of a valid region from an output from the first inverse fast fourier transformer; a second fast fourier transformer performing fast fourier transformation on an output of the windower to transform the output into a frequency domain; a second multiplier multiplying an output of the second fast fourier transformer by the PSS code of the home cell to generate the PSS symbol of the home cell using the estimated channel coefficient of the home cell; a second inverse fast fourier transformer transforming the estimated PSS symbol of the home cell into a time domain; a buffer buffering a signal in real time outputted from the decimator during the estimating of the PSS symbol of the home cell; a substractor subtracting the estimated PSS symbol of the home cell in a received signal outputted from the second inverse fast fourier converter from a signal outputted from buffer, the estimated PSS symbol being stored and outputted from the second inverse fourier converter; and a selector selecting one of a signal outputted from the substractor and a received signal outputted from the decimator according to whether the home cell is cancelled or not.

In even other embodiments, the selector may select a signal outputted from the decimator in response to a select signal during an initial cell search operation.

In yet other embodiments, the selector may select a signal outputted from the decimator in response to a select signal when the PSS code of the home cell is not identical to that of the neighbor cell during a neighbor cell search operation.

In further embodiments, the selector may select a signal outputted from the subtractor in response to a select signal when the PSS code of the home cell is identical to that of the neighbor cell during a neighbor cell search operation.

In still further embodiments, the first and second fast fourier transformers and the first and second inverse fast fourier transformers may perform respectively different fourier transformation operations according to a receiving antenna.

In even further embodiments, the first and second fast fourier transformers and the first and second inverse fast fourier transformers may have respectively different operating times according to a fast fourier transformation operation or an inverse fast fourier transformation operation.

In yet further embodiments, the first and second multipliers may have respectively different operating times.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Figure 1:
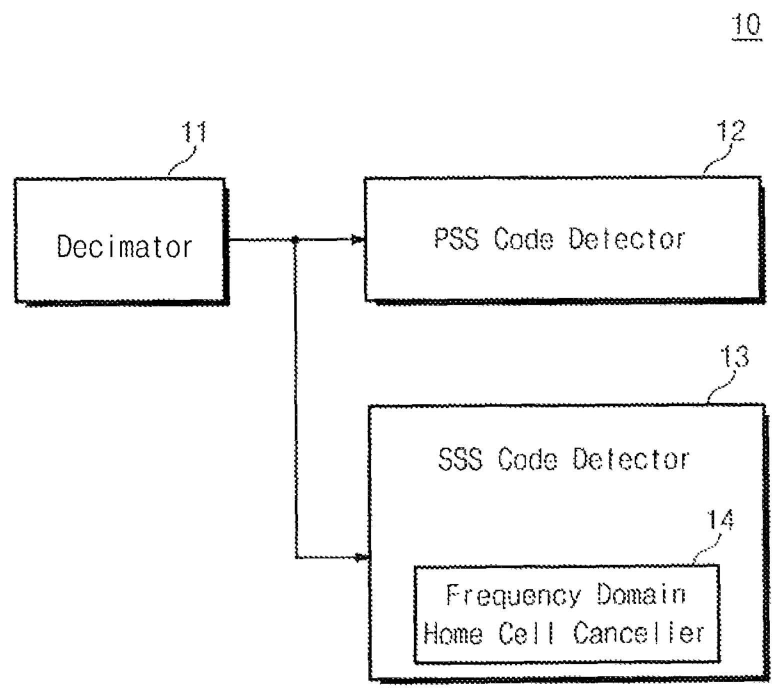
FIG. 1 is a view illustrating a typical neighbor cell searcher.

FIG. 1 is a view illustrating a typical neighbor cell searcher 10. Referring to FIG. 1, the typical neighbor cell searcher 10 includes a decimator 11, a Primary Synchronization Signal (PSS) code detector 12, and a Secondary Synchronization Signal (SSS) code detector 13. The SSS code detector 13 includes a frequency domain home cell canceller 14.

When the PSS codes of a home cell and a neighbor cell are the same and the home cell is synchronized with the neighbor cell, the typical neighbor cell searcher 10 estimates reception channel coefficients using the PSS code of a received PSS symbol, estimates a channel coefficient of the home cell using the SSS code of the home cell of the received PSS symbol, estimates a channel coefficient of the neighbor cell by subtracting the estimated channel coefficient of the home cell from the estimated reception channel coefficient, and compensates a channel of the received SSS symbol using the estimated channel coefficient of the neighbor cell.

At this point, a position for storing the received SSS symbol is transmitted from the PSS code detector 12. Here, a signal transmitted from the PSS code detector 12 includes a PSS code of a home cell synchronized with a neighbor cell. When a SSS symbol is stored using the received PSS symbol, the probability that the SSS symbol is to be stored is increased according to timing information of a home cell. Therefore, under a high-speed mobile environment, neighbor cell detection probability is decreased and false alarm probability of a PSS symbol is increased. Furthermore, it is applicable only when a home cell is synchronized with a neighbor cell.

Figure 2:
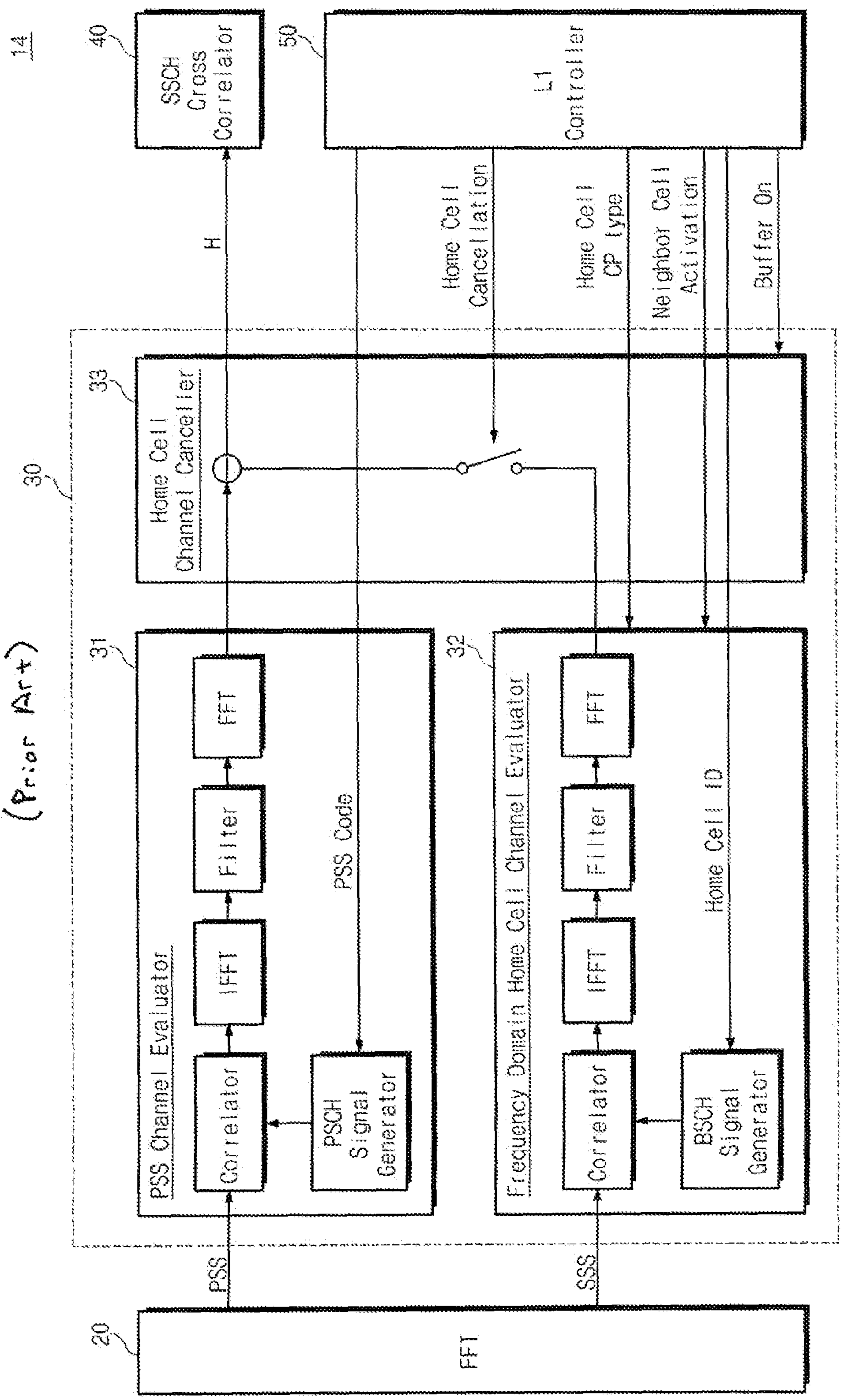
FIG. 2 is a view illustrating the frequency domain home cell canceller of FIG. 1.

FIG. 2 is a view illustrating the frequency domain home cell canceller 14 of FIG. 1. Referring to FIG. 2, the frequency domain home cell canceller 14 includes a fast fourier transformer (FFT) 20, a channel evaluator 30, a SSCH cross correlator 40, and an L1 controller 50. The channel evaluator 30 includes a PSS channel evaluator 31, a frequency domain home cell evaluator 32, and a home cell channel canceller 33.

The PSS channel evaluator 31 is used for initial cell search and neighbor cell search all in the SSS code detector 13 of FIG. 1. The PSS channel evaluator 31 estimates a reception channel coefficient of a PSS symbol in the SSS code detector 13 and compensates for a channel coefficient of the received SSS symbol.

The frequency domain home cell evaluator 32 estimates a channel coefficient by multiplying a conjugate value of a SSS code of a home cell by the received SSS symbol, filters only an impulse of a valid SSS code through windowing after the conversion into a time domain, and estimates a channel coefficient of a home cell by converting the filtered impulse of a valid SSS code into a frequency domain.

The home cell channel canceller 33 subtracts the channel coefficient of a home cell, which is outputted from the frequency domain home cell evaluator 32, from a PSS channel coefficient, which is outputted from the PSS channel evaluator 31, according to a control of the L1 controller 50.

An output value of the home cell channel canceller 33 is a result after a channel estimation coefficient of a home cell is cancelled from a channel estimation coefficient of the received SSS symbol. This increases the detection probability of a neighbor cell except a home cell.

However, in relation to a neighbor cell searching method adopting the frequency domain home cell cancelling method of FIG. 1, when PSS symbol timing is delivered from the PSS code detector 12 to the SSS code detector 13, information of a home cell is included in an input of the PSS code detector 12 and due to this, the probability that symbol timing information of a home cell is transmitted from the SSS code detector 13 is increased so that it is hardly applicable to an asynchronous system between cells.

The cell searcher according to an embodiment of the present invention is realized to increase the detection probability of a neighbor cell regardless of whether a home cell is synchronized with a neighbor cell or not.

Figure 3:
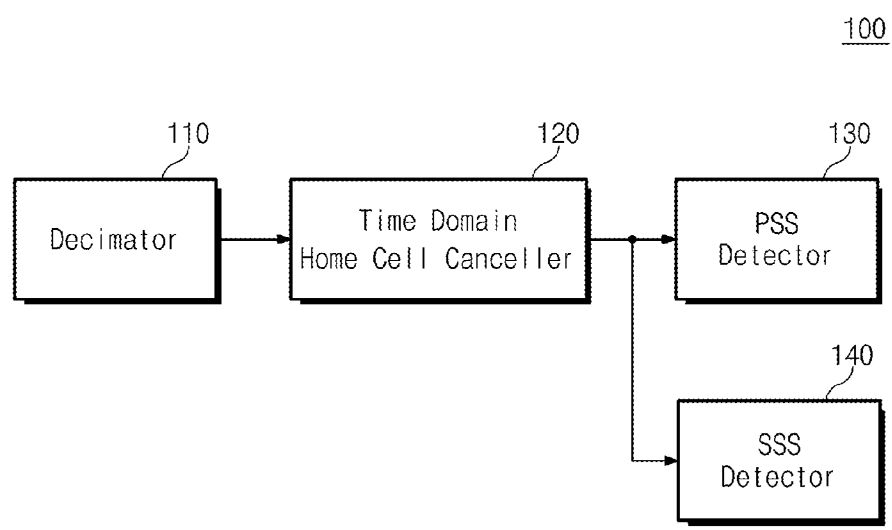
FIG. 3 is a view illustrating a cell searcher 100 according to an embodiment of the present invention.

FIG. 3 is a view illustrating a cell searcher 100 according to an embodiment of the present invention. Referring to FIG. 3, the cell searcher 100 includes a decimator 110, a time domain home cell canceller 120, a PSS code detector 130, and a SSS code detector 140.

The decimator 110 down-samples a clock frequency of a received signal into a sampling ratio that a process (not shown) processes. Here, the received signal is a result signal after a signal PSS or SSS, which is received by a mobile terminal, is digitalized by an analog to digital converter (not shown).

The time domain home cell canceller 120 estimates and cancels a PSS symbol of a home cell from the received signal outputted from the decimator 110 using a PSS code, a SSS code, and time synchronization information of a home cell when PSS codes of a home cell and a neighbor cell are the same during neighbor cell search.

The time domain home cell canceller 120 transmits the received signal outputted from the decimator 110 into the PSS code detector 130 or the SSS code detector 140 when the PSS codes of a home cell and a neighbor cell are different during neighbor cell search.

The PSS code detector 130 detects a PSS code of a neighbor cell by performing a correlation operation after receiving a signal outputted from the time domain home cell canceller 120.

The SSS code detector 140 performs a correlation operation by receiving the signal outputted from the time domain home cell canceller 120 so that it detects an SSS code of a neighbor cell.

The cell searcher 100 according to an embodiment of the present invention cancels the PSS symbol of a home cell estimated from the received signal in a time domain and detects a neighbor cell from the received signal in which the PSS symbol of a home cell is cancelled when the PSS codes of a home cell and a neighbor cell are the same.

Figure 4:
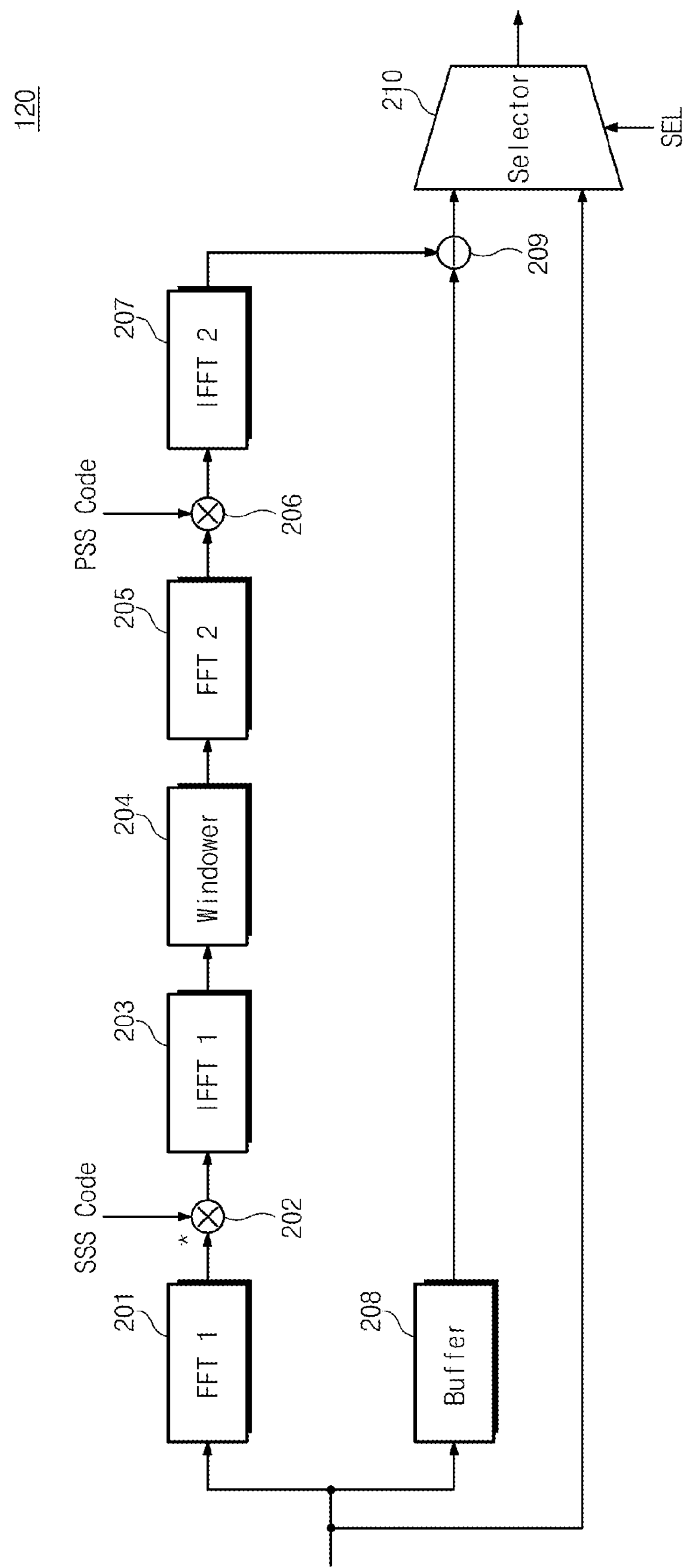
FIG. 4 is a view illustrating the time domain home cell canceller of FIG. 3 exemplarily.

FIG. 4 is a view illustrating the time domain home cell canceller 120 of FIG. 3 exemplarily. Referring to FIG. 4, the time domain home cell canceller 120 includes a first Fast Fourier Transformer 201 (FFT 1), a first multiplier 202, a first Inverse Fast Fourier Transformer (IFFT 1) 203, a windower 204, a second Fast Fourier Transformer (FFT 2) 205, a second multiplier 206, a second Inverse Fast Fourier Transformer (IFFT 2) 207, a buffer 208, a subtractor 209, and a selector 210.

The time domain home cell canceller 120 is activated when the PSS codes of a home cell and a neighbor cell are the same during neighbor cell search. Moreover, an operation for determining whether the PSS codes of a home cell and a neighbor cell are the same or not is performed by an L1-controller (not shown).

The FFT 1 201 converts the SSS symbol received from a time domain into a frequency domain by performing a fast fourier transformation on the SSS symbol of the received home cell. That is, the FFT 1 201 stores the SSS symbol of a home cell from an output of the decimator 110 using the previously estimated symbol timing information and radio frame synchronization information of a home cell and then converts the stored SSS symbol into a frequency domain.

The multiplier 202 multiplies an output signal of the FFT 1 201 by a conjugate value of a SSS code of a home cell. Therefore, a channel coefficient of a home cell is estimated.

The first IFFT 203 converts the estimated channel coefficient of a home cell through inverse fast fourier transformation so that an estimated channel coefficient of a home cell in a frequency domain is converted into a time domain.

The window 204 windows time impulse to extract a signal of a valid region from an output of the first IFFT 203. Thereby, a noise region of time impulse is cancelled, so that channel estimation accuracy is improved.

The FFT 2 205 converts an output of the window 204 in a time domain into a frequency domain by performing a fast fourier transformation thereon.

The second multiplier 206 multiplies an output of the FFT 2 205 by a PSS code of a home cell to generate a PSS symbol of a home cell using an estimated channel coefficient of a home cell. Thereby, a PSS symbol for a home cell is estimated in a frequency domain.

The second IFFT 207 converts an output of the second multiplier 206 through inverse fast fourier transformation so that it converts the estimated PSS symbol for a home cell in a frequency region into a time domain.

The buffer 208 buffers a received signal outputted from the decimator 110 in real time during the estimating of the PSS symbol of a home cell.

The subtractor 209 subtracts the stored estimated PSS symbol of a home cell, which is outputted from the second IFFT 207, from the received signal, which is outputted from the buffer 208. An output signal of the subtractor 209 is a signal in which a PSS symbol for a home cell is cancelled from an output signal of the decimator 110.

The selector 210 selects whether to output an output signal of the subtractor 209 or output an output signal of the decimator 110 in response to a select signal SEL received through a mobile terminal controller (not shown).

For example, the selector 210 outputs an output signal of the decimator 110 in response to a select signal SEL during initial cell search.

Moreover, if the selector 210 outputs an output signal of the decimator 110 in response to a select signal SEL when PSS codes of a home cell and a neighbor cell are different during neighbor cell search.

On the other hand, if the selector 210 outputs an output signal of the subtractor 209 in response to a select signal SEL when PSS codes of a home cell and a neighbor cell are the same during neighbor cell search.

In an embodiment, the FFT 1 120 and the FFT 2 205 and the IFFT 1 203 and the IFFT 2 207 perform different fourier transformation operations according to a receiving antenna.

In an embodiment, the FFT 1 120 and the FFT 2 205 and the IFFT 1 203 and the IFFT 2 207 have different operating times according to a fast fourier transformation operation or an inverse fast fourier transformation operation.

In an embodiment, the first and second multipliers 202 and 206 have respectively different operating times.

The time domain home cell canceller 120 according to an embodiment of the present invention bypasses a signal outputted from the decimator 110 during an initial cell search operation or a neighbor cell search operation where the PSS codes of a home cell and a neighbor cell are different, and cancels the PSS symbol for a home cell from the signal outputted from the decimator 110 during a neighbor cell search operation where the PSS codes of a home cell and a neighbor cell are the same.

Figure 5:
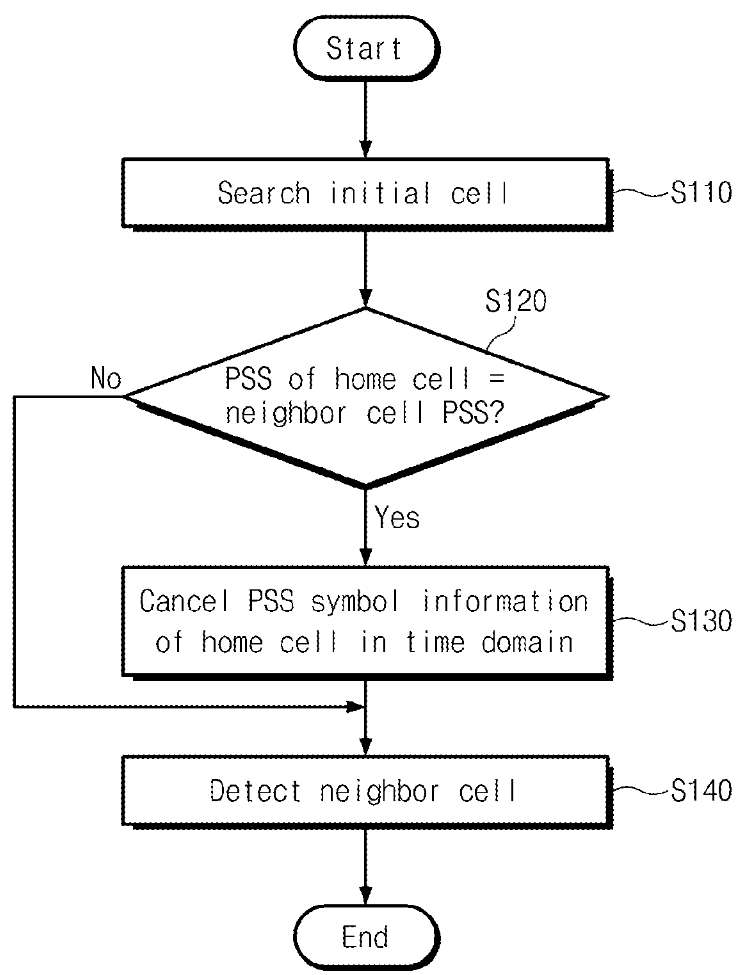
FIG. 5 is a flowchart illustrating a cell search method according to an embodiment of the present invention.

FIG. 5 is a flowchart illustrating a cell search method according to an embodiment of the present invention. Referring to FIGS. 3 through 5, a cell searching method is as follows.

The cell searcher 100 of FIG. 3 in a mobile terminal performs an initial cell search operation in operation S110. The initial cell search operation is as follows. The cell searcher 100 detects a received PSS symbol and symbol synchronization timing by using the PSS code detector 130 of FIG. 3. The SSS code detector 140 detects an SSS code using the PSS symbol and symbol synchronization timing detected by the PSS code detector 130.

The SSS code detector 140 stores PSS and SSS, which are received during symbol synchronization timing using a PSS code, in a buffer (not shown), estimates a channel coefficient by multiplying a conjugate value of the PSS code by one obtained after converting the buffered PSS symbol into a frequency domain, and compensates a channel using a channel coefficient estimated after the converting the received SSS symbol into a frequency domain. Later, the cell searcher 100 performs a cross correlation operation with 167 SSS codes. The cell searcher 100 detects the largest SSS code as an SSS code of a home cell based on a result of the cross correlation operation. Therefore, an initial cell search operation is completed.

After a home cell is searched through the initial cell search operation in operation S110, the cell searcher 100 performs a neighbor cell search operation. First, the cell searcher 100 determines whether PSS codes of a home cell and a neighbor cell are the same or not in operation S120.

If the PSS codes of a home cell and a neighbor cell are the same, the time domain home cell canceller 120 of the cell searcher 100 cancels a PSS symbol for a home cell from a signal outputted from the decimator 110 in a time domain in operation S 130. The cancelling of the PSS symbol for a home cell is the same as that of FIG. 4.

Next, each of the PSS code detector 130 of FIG. 3 and the SSS code detector 140 of FIG. 3 receives a signal with the PSS symbol for a home cell cancelled and then performs a cross correlation operation to detect a neighbor cell.

Moreover, if the PSS codes of a home cell and a neighbor cell are different, each of the PSS code detector 130 of FIG. 3 and the SSS code detector 140 of FIG. 3 receives a signal from the decimator 110 and then performs a cross correlation operation to detect a neighbor cell in operation S 140.

Figure 6:
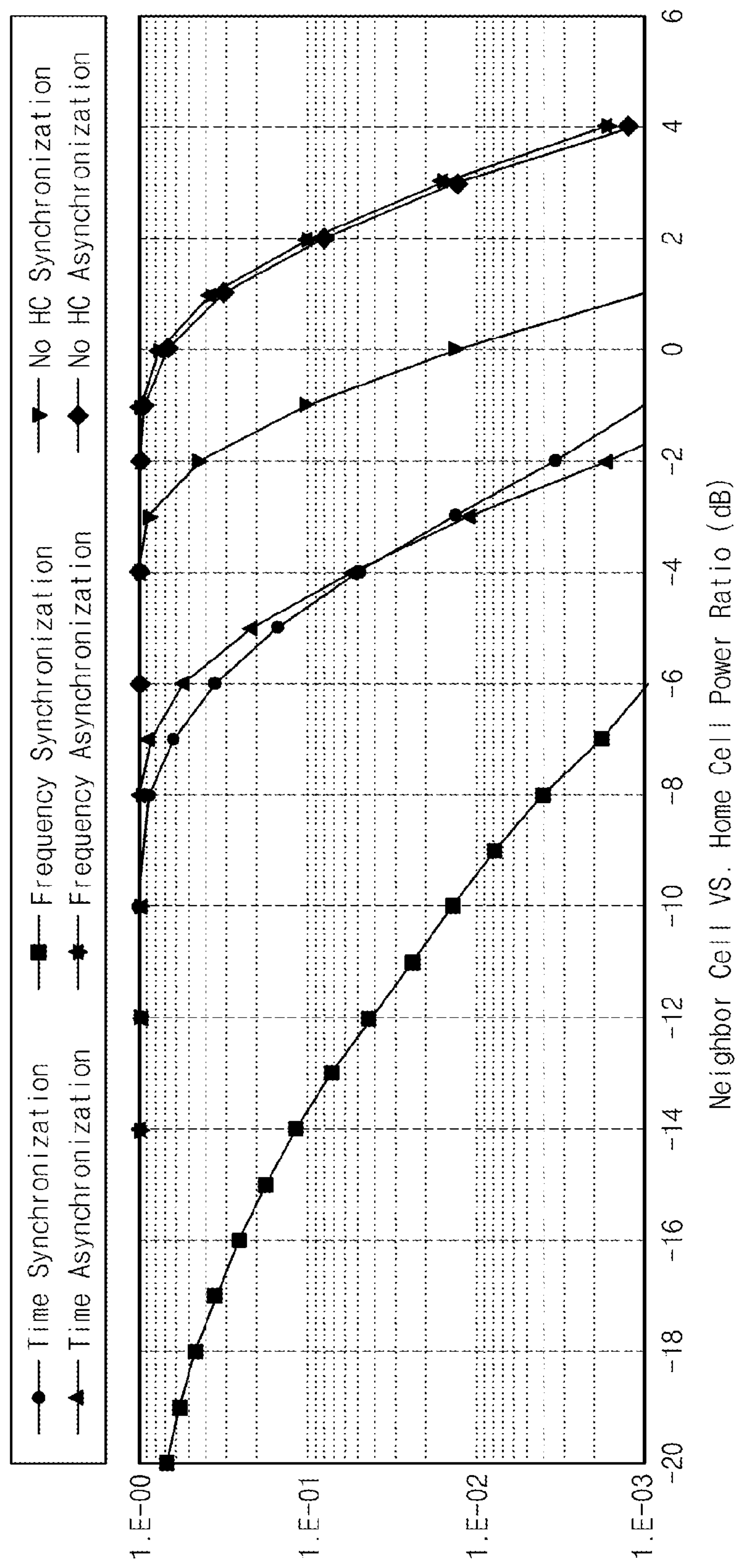
FIG. 6 is a view illustrating effects of a cell searcher according to an embodiment of the present invention.

FIG. 6 is a view illustrating effects of a cell searcher according to an embodiment of the present invention. Referring to FIG. 6, under synchronization and asynchronization environments when the PSS codes between a home cell and a neighbor cell are the same, a time domain home cell cancelling method, a frequency domain home cell cancelling method, and a neighbor cell detection result without a home cell canceller are shown.

When a home cell cancelling function is performed in all frequency and time domains under the synchronization environment, a home cell and neighbor cells have a better performance. However, timing information of a home cell is reflected on an output of the PSS code detector during the home cell cancellation of a frequency domain and due to this, false detection probability is increased.

Whether a home cell cancellation technique is used or not under the asynchronization environment makes no difference in a home cell and neighbor cells but the time domain home cell cancellation technique has a similar performance regardless of synchronization and asynchronization of a home cell and a neighbor cell.

This is because a symbol of a home cell is not stored in the received PSS, which is buffered during SSS code detection at a PSS symbol timing position provided from the PSS code detector to the SSS code detector, or the buffered received PSS symbol includes a symbol of a home cell while a PSS symbol of a neighbor cell is not buffered.

It looks like that performance of a frequency domain canceller under a synchronization environment of a home cell and a neighbor cell is more excellent than that of a time domain home cell canceller, but when PSS code detection applied to SSS code detection is performed during an actual frequency domain home cell cancellation operation, the PSS codes of a home cell and a neighbor cell are simultaneously received thereby increasing PSS detection probability. However, when the actual PSS detection probability is applied to the SSS code detection to cancel a home cell, false detection probability is increased.

The time domain home cell canceller has almost no performance difference with respect to a timing relationship of a home cell and a neighbor cell. When the time domain home cell canceller is applied, an input signal of the PSS code detector is inputted with the PSS information of a home cell cancelled, so that symbol timing influence is reduced to output symbol timing information of the PSS code detector. As a result, SSS symbol detection probability about a neighbor cell is increased.

The cell searcher 100 and a cell searching method thereof according to an embodiment of the present invention are applicable to a 3rd Generation Partnership Project (3GPP) Long Term Evolution (LTE) system.

A cell searcher of a mobile terminal and a neighbor cell searching method thereof according to embodiments of the present invention allow neighbor cell search to be easy by cancelling a PSS symbol of a home cell from a time domain when PSS codes of a home cell and a neighbor cell are the same.

The present invention increases neighbor cell search probability and also deceases false detection probability regardless of synchronization and asynchronization of a home cell and a neighbor cell by cancelling a PSS symbol of a home cell in a time domain.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A neighbor cell searching method of a mobile terminal, the method comprising:

after searching a home cell, determining whether a Primary Synchronization Signal (PSS) code of the home cell is identical to that of a neighbor cell;

when the PSS code of the home cell is identical to that of the neighbor cell, removing a PSS symbol from a received signal originating from the home cell from a received signal in a time domain; and searching for the neighbor cell from the received signal originating from the home cell with the PSS symbol of the home cell removed, wherein the removing of the PSS symbol of the home cell further comprises estimating a channel coefficient using a Secondary Synchronization Signal (SSS) symbol of the home cell.

2. The method of claim 1, wherein the removing of the PSS symbol of the home cell further comprises removing an estimated PSS symbol of the home cell in a time domain.

3. The method of claim 2, wherein the removing of the PSS symbol of the home cell comprises:

estimating a channel coefficient of the home cell using a SSS code of the home cell;

multiplying the estimated channel coefficient of the home cell by the PSS code of the home cell to estimate the PSS symbol of the home cell; and converting the estimated PSS symbol of the home cell in a frequency domain into a time domain; and removing the converted PSS symbol of the home cell from a received signal inputted in a buffer in real-time while the PSS symbol of the home cell is transmitted in a time domain.

4. The method of claim 1, further comprising searching the neighbor cell from the received signal when the PSS code of the home cell is not identical to that of the neighbor cell.

5. The method of claim 1, wherein the mobile terminal uses a communication protocol of a 3rd Generation Partnership Project (3GPP) Long Term Evolution (LTE) system.

6. The method of claim 5, wherein each of the home cell and the neighbor cell corresponds to a combination of one of 3 PSS codes and one of 168 SSS codes.

7. The method of claim 6, wherein the searching of the neighbor cell comprises detecting one of the 3 PSS codes corresponding to the neighbor cell and detecting one of the 168 SSS codes corresponding to the neighbor cell.

8. A cell searcher of a mobile terminal comprising:

a decimator down-sampling a clock frequency of a received signal into an internally-processable sampling ratio;

a time domain home cell remover receiving a signal outputted from the decimator and, when a Primary Synchronization Signal PSS code of a home cell is identical to that of a neighbor cell, removing a PSS symbol from a received signal originating from the home cell which is from a signal outputted from the decimator in a time domain;

a PSS detector detecting a PSS code by performing a cross correlation operation, on receiving a signal outputted from the time domain home cell remover; and an Secondary Synchronization Signal SSS detector detecting an SSS code by performing the cross correlation operation, on receiving of the signal outputted from the time domain home cell remover, wherein the removing of the PSS symbol of the home cell further comprises estimating a channel coefficient using a Secondary Synchronization Signal (SSS) symbol of the home cell.

9. The cell searcher of claim 8, wherein, during an initial cell search operation of the mobile terminal, the time domain home cell remover delivers a signal outputted from the decimator into the PSS detector and the SSS detector.

10. The cell searcher of claim 9, wherein, when the PSS code of the home cell is not identical to that of the neighbor cell during a neighbor cell search operation of the mobile terminal, the time domain home cell remover delivers a signal outputted from the decimator to the PSS detector and the SSS detector.

11. The cell searcher of claim 10, wherein the time domain home cell remover comprises:

a first fast fourier transformer, after storing the SSS symbol of the home cell from an output of the decimator using previously estimated symbol timing information and radio frame synchronization information of a home cell, transforming the stored SSS symbol into a frequency domain;

a first multiplier multiplying an output of a the first fast fourier transformer by a conjugate value of an SSS code of the home cell to estimate a channel coefficient of the home cell;

a first inverse fast fourier transformer converting an output of the first multiplier into a time domain;

a windower windowing time impulse to extract a signal of a valid region from an output from the first inverse fast fourier transformer;

a second fast fourier transformer performing fast fourier transformation on an output of the windower to transform the output into a frequency domain;

a second multiplier multiplying an output of the second fast fourier transformer by the PSS code of the home cell to generate the PSS symbol of the home cell using the estimated channel coefficient of the home cell;

a second inverse fast fourier transformer transforming the estimated PSS symbol of the home cell into a time domain;

a buffer buffering a signal in real time outputted from the decimator during the estimating of the PSS symbol of the home cell;

a substractor subtracting the estimated PSS symbol of the home cell in a received signal outputted from the second inverse fast fourier converter from a signal outputted from buffer, the estimated PSS symbol being stored and outputted from the second inverse fourier converter; and a selector selecting one of a signal outputted from the substractor and a received signal outputted from the decimator according to whether the home cell is removed or not.

12. The cell searcher of claim 11, wherein the selector selects a signal outputted from the decimator in response to a select signal during an initial cell search operation.

13. The cell searcher of claim 11, wherein the selector selects a signal outputted from the decimator in response to a select signal when the PSS code of the home cell is not identical to that of the neighbor cell during a neighbor cell search operation.

14. The cell searcher of claim 11, wherein the selector selects a signal outputted from the subtractor in response to a select signal when the PSS code of the home cell is identical to that of the neighbor cell during a neighbor cell search operation.

15. The cell searcher of claim 11, wherein the first and second fast fourier transformers and the first and second inverse fast fourier transformers perform respectively different fourier transformation operations according to a receiving antenna.

16. The cell searcher of claim 11, wherein the first and second fast fourier transformers and the first and second inverse fast fourier transformers have respectively different operating times according to a fast fourier transformation operation or an inverse fast fourier transformation operation.

17. The cell searcher of claim 11, wherein the first and second multipliers have respectively different operating times.

* * * * *